US007944836B2

(12) United States Patent
Chinnaswamy et al.

(10) Patent No.: US 7,944,836 B2
(45) Date of Patent: May 17, 2011

(54) ADAPTIVE METHOD AND APPARATUS FOR ADJUSTING NETWORK TRAFFIC VOLUME REPORTING

(75) Inventors: Sudhagar Chinnaswamy, Milpitas, CA (US); Arunkumar Desigan, Santa Clara, CA (US); Brian Kean, Cincinnati, OH (US)

(73) Assignee: Ericsson AB, Stockholm (SE)

( * ) Notice: Subject to any disclaimer, the term of this patent is extended or adjusted under 35 U.S.C. 154(b) by 251 days.

(21) Appl. No.: 11/948,015

(22) Filed: Nov. 30, 2007

(65) Prior Publication Data

US 2009/0059812 A1 Mar. 5, 2009

Related U.S. Application Data

(60) Provisional application No. 60/966,878, filed on Aug. 29, 2007.

(51) Int. Cl.
*H04J 1/16* (2006.01)
(52) U.S. Cl. ...................................... 370/235; 370/230
(58) Field of Classification Search .................. 370/392, 370/235, 252, 282, 395.21; 709/246, 235, 709/232, 224; 455/522; 702/186; 705/1
See application file for complete search history.

(56) References Cited

U.S. PATENT DOCUMENTS

| 6,643,612 | B1 * | 11/2003 | Lahat et al. ................... 702/186 |
| 7,194,554 | B1 * | 3/2007 | Short et al. .................... 709/246 |
| 7,460,536 | B1 * | 12/2008 | Williams et al. .............. 370/392 |
| 2003/0037158 | A1 * | 2/2003 | Yano et al. .................... 709/232 |
| 2003/0103470 | A1 * | 6/2003 | Yafuso .......................... 370/282 |
| 2004/0062200 | A1 * | 4/2004 | Kesavan ....................... 370/235 |
| 2004/0199659 | A1 * | 10/2004 | Ishikawa et al. .............. 709/235 |
| 2005/0021746 | A1 * | 1/2005 | Drouet et al. ................. 709/224 |
| 2005/0276271 | A1 * | 12/2005 | Zhang ...................... 370/395.21 |
| 2007/0179796 | A1 * | 8/2007 | Taglienti et al. ................. 705/1 |
| 2007/0281726 | A1 * | 12/2007 | Rey et al. ...................... 455/522 |
| 2008/0170500 | A1 * | 7/2008 | Ito et al. ....................... 370/235 |

OTHER PUBLICATIONS

Redback Networks, Inc., "Basic System Configuration Guide-SmartEdge OS", 1998-2007, Chapter 8, pp. 8-27.
Redback Networks, Inc., "IP Services and Security Configuration Guide-SmartEdge OS", 1998-2007, Part 6, Chapter 16, pp. 16-1 to 16-70.
Redback Networks, Inc., "IP Services and Security Configuration Guide-SmartEdge OS", 1998-2007; Appendix A-22.

* cited by examiner

*Primary Examiner* — Kwang B Yao
*Assistant Examiner* — Syed M Bokhari
(74) *Attorney, Agent, or Firm* — Blakely Sokoloff Taylor & Zafman LLP

(57) ABSTRACT

An adaptive method and apparatus for accurate network traffic volume limit reporting including receiving a network traffic volume limit for each subscriber based on the subscriber's level of service and reporting the network traffic volume on a more frequent basis for subscribers who are approaching their network volume limit.

24 Claims, 8 Drawing Sheets

Method 600

ADAPTIVE METHOD AND APPARATUS FOR ADJUSTING NETWORK TRAFFIC VOLUME REPORTING

PRIORITY INFORMATION

This application claims priority to provisional application Ser. No. 60/966,878 filed Aug. 29, 2007.

FIELD OF THE INVENTION

The invention relates to the transmission of data over communications networks. More specifically, the invention relates to adaptive methods and apparatuses for increasing the accuracy of network traffic volume reporting.

BACKGROUND OF THE INVENTION

With the advent of the Internet and the World Wide Web (WWW) and the growing popularity of the Internet, the volume of traffic over networks has increased substantially. As a result, the need for high-speed data transmission has increased. Maintaining an efficient flow of information over data communication networks is becoming increasingly important.

Service provider networks generally have any number of subscribers with a wide variety of network utilization requirements. For example, some subscribers may run real-time applications such as video and voice over IP, which involve transmitting and receiving data packets that require a large bandwidth, short latency, small latency jitter, and a reasonably small data loss ratio. On the other hand, other subscribers may only run data processing applications and email, and, generally, transmitting email messages and application data can be done with lower bandwidth, longer latency, and larger latency jitter. It is not usually critical that email be delivered instantly since email services can usually tolerate longer latencies and lower bandwidth utilization than other services. As a result, different subscribers have different needs based on any number of factors including the type of applications a subscriber may be using.

Since service providers charge a fee for bandwidth utilization, customers often pay different amounts for different levels of service. However, providing different levels of service to different subscribers can often be a challenge. One problem is managing bandwidth utilization among several subscribers each with different level of service agreements. To do so, service providers often place a volume limit on the amount of network traffic that can be sent and/or received to/from each subscriber based on each subscriber's level of service. This is known as a network traffic volume limit. Whenever a user exceeds his or her allocated network traffic volume limit, a decision is made to take action based on a predetermined policy. Usually this decision is implemented in an Authentication, Authorization, and Accounting (AAA) module or process.

An AAA process provides three important functions in networks. Essentially, an AAA process is a program that handles user requests for access to network resources and provides authentication, authorization and accounting services. The AAA process typically interacts with network access and gateway servers and with databases and directories containing user information. The user information may include a particular subscriber's bandwidth utilization network traffic volume limits, and other user-specific information. Authentication, authorization, and accounting (AAA) is a term for a framework for intelligently controlling access to network resources, enforcing policies, auditing usage, and providing information necessary to bill for services. These combined processes are considered information for effective network management and security. As the first process, authentication is essentially proving who you are. That is, authentication provides a way of identifying a user, typically by having the user enter a valid username and password before access is granted. The process of authentication is based on each user having a unique set of criteria for gaining access. The AAA process compares a user's authentication credentials with other user credentials stored in a database. If the credentials match, the user is granted access to the network. If the credentials don't match, authentication fails and network access is denied. Following authentication, a user must gain authorization for doing certain tasks. Authorization is defining what a subscriber is and is not allowed to do. After logging into a system, for example, the user may try to issue commands. The authorization process determines whether the user has the authority to issue such commands. In this way, authorization is the process of enforcing policies and determining what types or qualities of activities, resources, or services a user is permitted. Usually, authorization occurs within the context of authentication. Once you have authenticated a user, they may be authorized for different types of access or activity. Finally, accounting measures the resources a user consumes during the access. This can include the amount of system time or the amount of data a user has sent and/or received during a session. Accounting is carried out by logging session statistics and usage information and is used for authorization control, billing, trend analysis, resource utilization, and capacity planning activities.

The current standard by which devices or applications communicate with an AAA process is the remote authentication dial-in user service (RADIUS). Thus, a server that communicates with an AAA process (client) is often called a RADIUS server.

An AAA process is used to implement network policies such as network volume limits. Referring to FIG. 1, which illustrates an exemplary network element according to the prior art. Exemplary system 100 illustrates a prior art system for connecting Subscribers 135 with Internet and/or Services Providers 133. For the purposes of this application, service providers may be any the following: a company which provides subscribers with an Internet gateway and/or Internet content; a telecommunications company which provides network infrastructure; a company or firm which provides a Virtual Private Network (VPN) connection to its employees; or any network-addressable entity that accepts and executes requests from consumers. It can be a mainframe system, a component, or some other type of software or hardware system that executes service requests.

In FIG. 1, Network Element 101 communicates with RADIUS Server 125 across a Communication Link. Various information such as network traffic volume limits and policies is communicated. Network element 101 also includes a number of packet processors including Ingress Packet Processors 111 and 112, and Egress Packet Processors 117 and 118 for receiving and forwarding data packets across the network. That is, Network Element 101 provides a channel of communication between Subscribers 135 and Internet and/or Service Providers 133 via the various Ingress Packet Processors 111 and 112, and Egress Packet Processors 117 and 118 across a network mesh such as Network Mesh 309, which may be any network mesh known in the art. For example, Network Mesh 309 may be a switch fabric, which includes a full mesh such that each of Ingress Processors 111, 112, and Egress Processors 117 and 118 are coupled to one another.

Further, Network Element 101 includes Control Card 123 which includes AAA Process 122. AAA process 122, in one embodiment, is a BSD process. BSD processes refer to any software process known in the art as Berkeley Software Distribution process of a UNIX operating system (OS), also referred to as BSD UNIX. Control card 123 is also coupled to each of the Ingress and Egress Packet Processors 111, 112, 117 and 118 through Network Mesh 309.

As discussed above, AAA Process 122 of Control Card 123 performs the three primary services required by a RADIUS server such as RADIUS Server 125. All authentication, authorization, and accounting are performed on Control Card 123 as it monitors the network traffic from Subscribers 135 to Internet and/or Service Providers 133 and vice versa.

Referring to FIG. 2, which illustrates network traffic volume limit reporting in an exemplary network element according to the prior art. Exemplary prior art system 200 includes Network Element 201 and RADIUS Server 221. Network Element 201 includes Control Card 203 which includes AAA Process 217. Network Element 201 also includes Ingress and Egress Packet Processors 207 and 208 respectively. Data sent across a network from subscribers (not shown) to service providers (not shown), and vice versa, traverses through Ingress and Egress Packet Processors 207 and 208 respectively. RADIUS Server 221 sends a network traffic volume limit value configured for each subscriber on the network to Network Element 201 where it is stored in AAA Process 217 on Control Card 203.

During operation, Ingress Packet Processor 207 and Egress Packet Processor 208 both report network traffic volume exceeded events directly to AAA Process 217 through Ingress Traffic Volume Exceeded message 211 and Egress Traffic Volume Exceeded message 213 respectively. To do this, Ingress Process 207 and Egress Processor 208 maintain a set of counters (not shown) which determine the network traffic volume through each of the respective packet processors. Each of the packet processors reports the traffic volume to AAA Process 217 of Control Card 203.

Whenever the network traffic volume limit is exceeded in either the Ingress or Egress directions, AAA Process 217 notifies RADIUS Server 221. Specifically, whenever the network traffic volume limit is exceeded in the Ingress direction through Ingress Packet Processor 207, AAA Process 217 sends Accounting-Interim-Update (Reason: Ingress Volume Limit Exceeded) message 227 to RADIUS Server 221, and whenever the network traffic volume limit is exceeded in the Egress direction through Egress Packet Processor 208, AAA Process 217 passes Accounting-Interim-Update (Reason: Egress Volume Limit Exceeded) message 228 to Server 221. AAA Process 217, then, implements a predetermined policy received from Server 221 via Network Policy Message 239. Network Policy Message 239 indicates what action is to be taken. For example, RADIUS Server 221 may have in place a policy to disconnect a subscriber (drop packet forwarding for the subscriber) whenever his or her volume limit is reached. Alternatively, the policy may be to re-direct a subscriber to a website where the subscriber may purchase more bandwidth.

In prior art System 200; however, there is always a delay between the moment a subscriber exceeds the volume limit and the time it takes for the packet processors to report their respective traffic volume to the AAA process to implement the network policy. This is because current systems, like prior art system 200, receive network traffic volume limit reporting at periodic intervals. The periodic interval is generally global across all subscribers and is determined by the number of subscribers who are loading the system at any particular point. As the subscriber loading increases, it becomes prohibitive to report traffic volume at frequent intervals. This is because the number of messages passed back and forth between the various network elements becomes increasingly large as subscriber loading increases leading to longer periods between reporting.

Additionally, in prior art systems such as those depicted in FIGS. 1 and 2, the volume limits could not be aggregated when they were reported by Ingress Processor 207 and Egress Processor 208. This is because Ingress Processor 207 and Egress Processor 208 are two different entities that have different processors, memories, addressing schemes, and etc.

SUMMARY OF THE INVENTION

An adaptive method and apparatus for accurate network traffic volume limit reporting is disclosed including receiving a network traffic volume limit for each of a plurality of subscribers and reporting the network traffic volume on a more frequent basis for subscribers who are approaching their network volume limit.

BRIEF DESCRIPTION OF THE DRAWINGS

A better understanding of the present invention can be obtained from the following detailed description in conjunction with the following drawings, in which.

DETAILED DESCRIPTION

Figure 1:
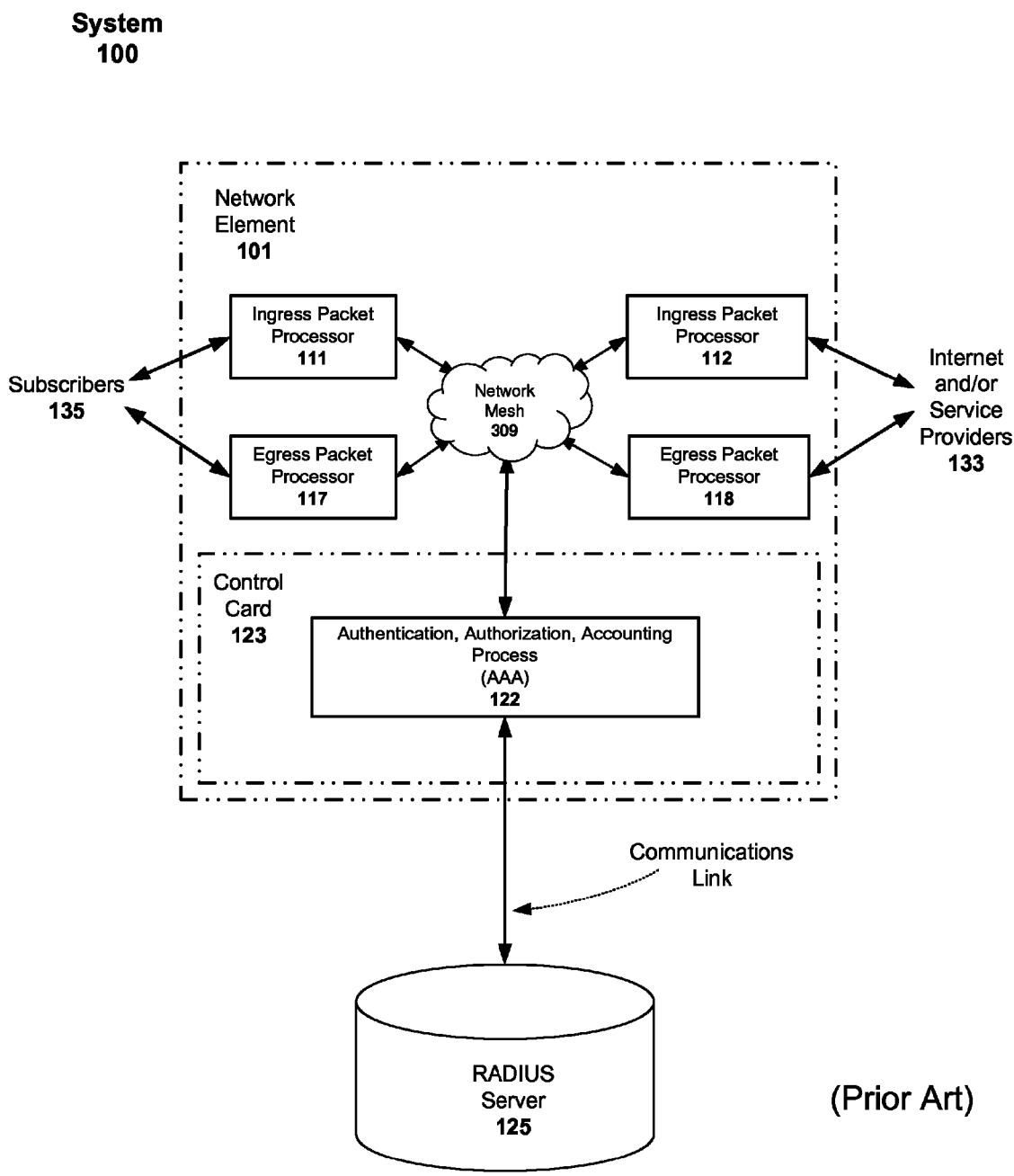
FIG. 1 illustrates an exemplary network element according the prior art.
Figure 2:
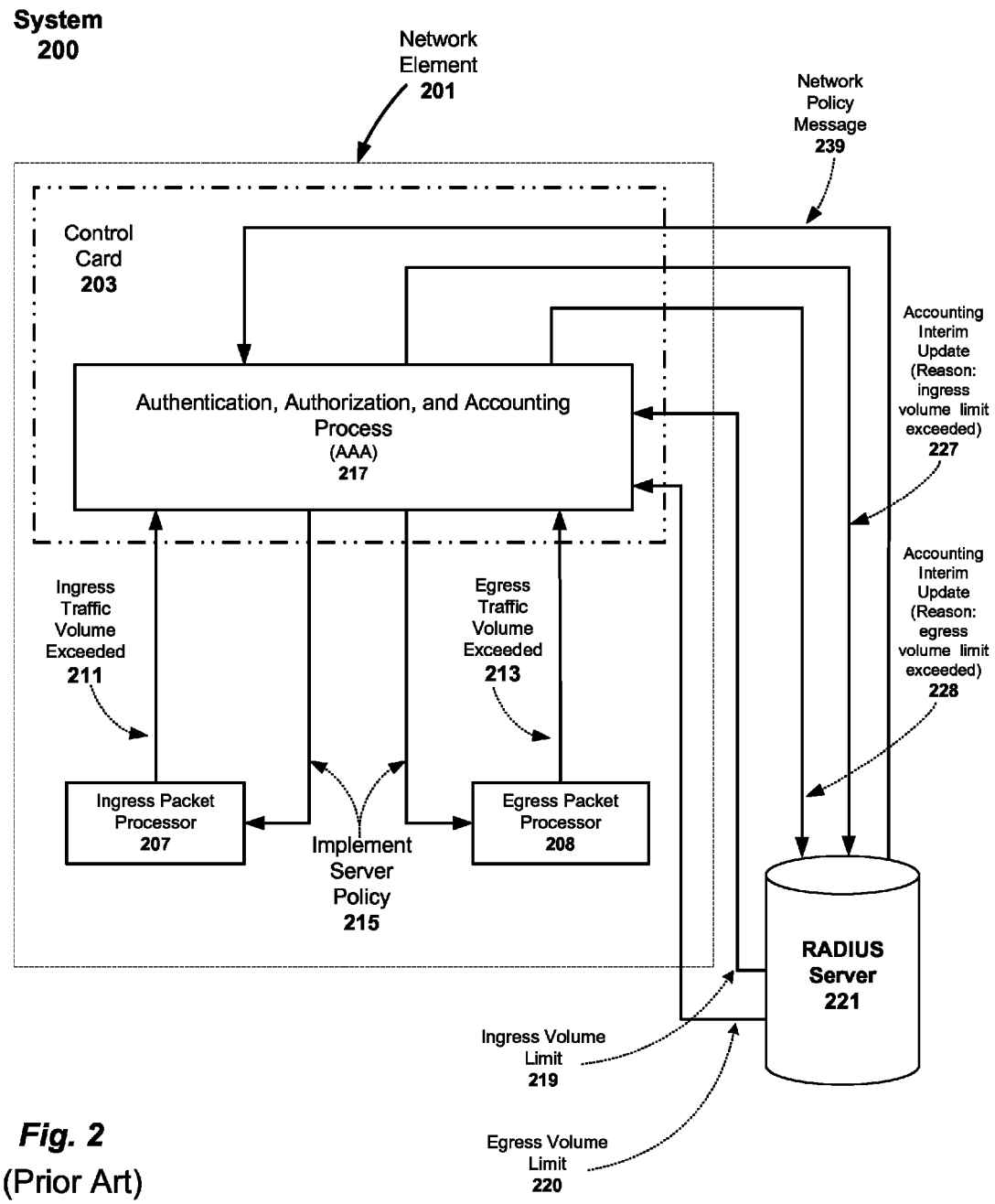
FIG. 2 illustrates network traffic volume limit reporting in an exemplary network element according to the prior art.

Throughout the description, for the purposes of explanation, numerous specific details are set forth in order to provide a thorough understanding of the invention. It will be apparent, however, to one skilled in the art that the invention may be practiced without some of these specific details. In other instances, well-known structures and devices are shown in block diagram form to avoid obscuring the underlying principles of the invention.

References in the specification to "one embodiment," "an embodiment," "an example embodiment," etc., indicate that the embodiment described may include a particular feature, structure, and/or characteristic, but every embodiment may not necessarily include the particular feature, structure, and/ or characteristic. Moreover, such phrases are not necessarily referring to the same embodiment. When a particular feature, structure, and/or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended to be synonymous with each other. Rather, in particular embodiments, "connected" is used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatus for performing the operations herein. This apparatus may be specially constructed for the required purposes, or it may comprise a general purpose computer selectively activated or reconfigured by a computer program stored in the computer. Such a computer program may be stored or transmitted in a machine-readable medium, such as, but is not limited to, a machine-readable storage medium (e.g., any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions), or a machine-readable transmission medium such as, but not limited to, any type of electrical, optical, acoustical or other form of propagated signals (e.g., carrier waves, infrared signals, digital signals, etc.).

The algorithms and displays presented herein are not inherently related to any particular network element or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

An adaptive method and apparatus for network traffic volume reporting is described. As discussed above, prior art systems report a subscriber's bandwidth utilization at periodic intervals. For service providers who require strict accounting practices, the amount of time delay built into these systems may be unacceptable when a subscriber is receiving more than his or her allocated bandwidth. Accordingly, what is needed is an adaptive method of network volume reporting in order to reduce the amount of time between when a particular subscriber exceeds his or her allocated network volume limit and when the server takes the appropriate action. Often, many subscribers' bandwidth utilization is not near the subscribers' network volume limit, so infrequent reporting is acceptable. This invention reduces processing power and internal network element traffic (message passing) by having a higher frequency of reporting only for those subscribers that are more likely to exceed their volume limit. Embodiments of the present invention dynamically adjust the frequency of reporting based on the nearness of a subscribers' reported network volume to the network volume limit. Embodiments may also set the reporting frequency higher for subscribers with low network volume limits.

Additionally, since some service providers desire to monitor each subscribers total bandwidth utilization (i.e., in both the ingress and egress directions), what is needed is to have a single entity running on the control card of a network element that is operable to aggregate the ingress and egress network traffic so that an aggregate network volume limit may be established to restrict a subscriber's total network bandwidth utilization.

Figure 3A:
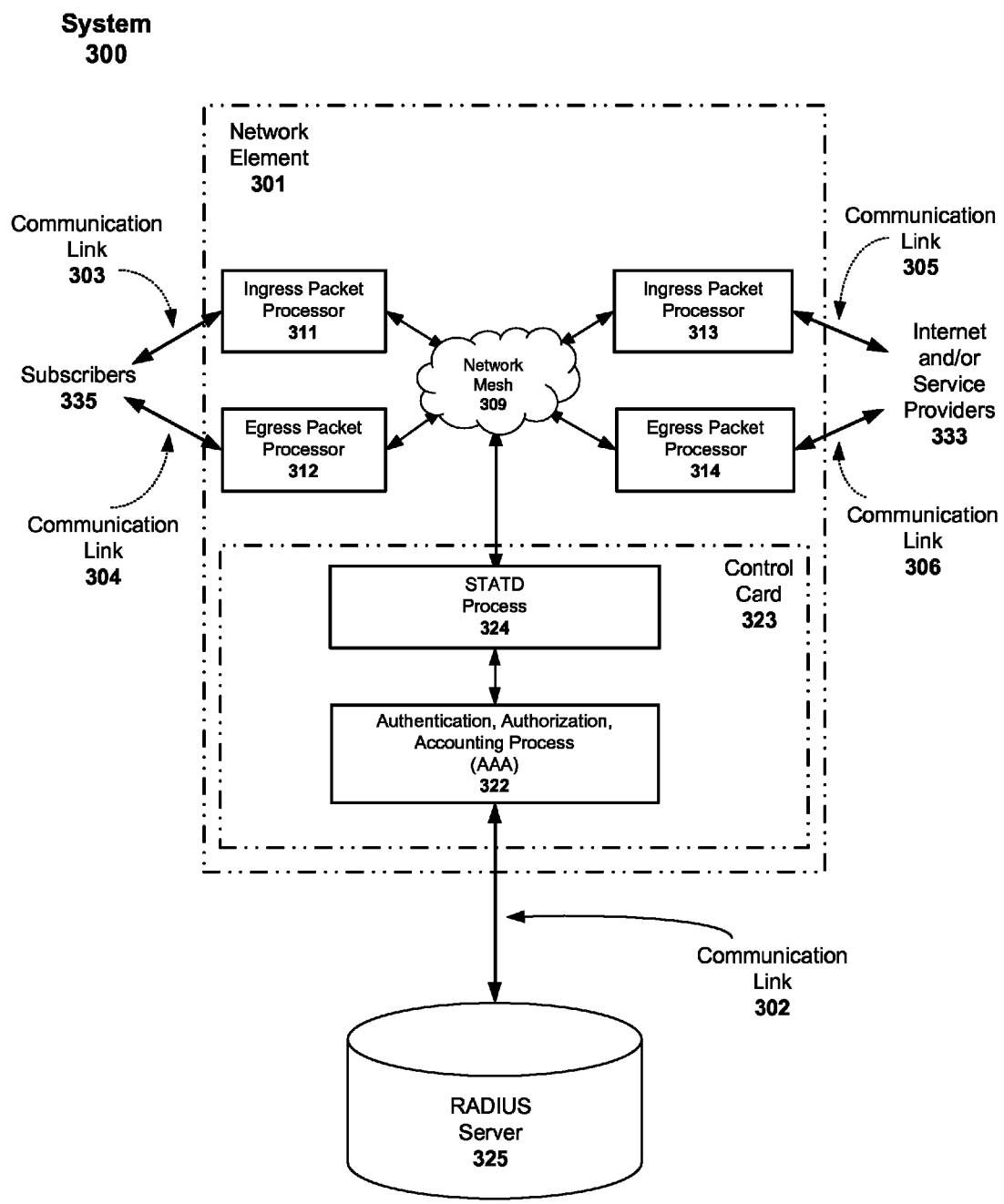
FIG. 3A illustrates an exemplary network element according to one embodiment of the invention.

Referring now to FIG. 3A, which illustrates an exemplary network element according to one embodiment of the invention. Exemplary System 300 includes Network Element 301, RADIUS Server 325, Communication Links 303-306, Subscribers 335 and Internet and/or Service Providers 333. Subscribers 335 can be any of several types of subscribers including L2TP, Wireless, and etc. Network Element 301 includes Ingress Packet Processor 311, Egress Packet Processor 312, Ingress Packet Processor 313, Egress Packet Processor 314, Network Mesh 309, and Control Card 323. Control Card 323 further includes BSD Processes STATD Process 324 and AAA Process 322. Communication links 303-306, in one embodiment, may include a broadcast network transmission line, which employs the Ethernet standard. However, embodiments of the present invention are not so limited. Examples of other types of broadcast media include, but are not limited to, Fiber Distributed Data Interface (FDDI) and Token Ring.

Network Element 301 can be any type of network element known in the art. For example, Network Element 301 may be any of routers, switches, bridges, or other types of network elements that switch data across a network. In one embodiment, network Element 301 communicates with RADIUS Server 325 across Communication Link 302 using the synchronous Optical Network (SONET) standard or Synchronous Digital Hierarchy (SDH). However, embodiments of the present invention are not so limited, as data traffic among network elements can be transferred using other types of transmission standards. Examples of other types of transmission standards may include, but are not limited to, Ethernet, T1, T3, Data Signal 3 (DS3), and DS1 signals. In another embodiment, Communication Link 302 may be a point-to-point connection. In such a case, Server 325 and Network Element 301 are connected to one another directly. Further, a different configuration of the network elements could exist. Examples of other types of network architectures that can incorporate embodiments of the system in which the present invention is implemented include, but are not limited, a point-to-multi-point configuration, and a hub configuration.

Additionally, Communication Links 303 and 304 connecting Ingress Packet Processors 311 and 312 to Subscribers 335 may be any of the aforementioned types of transmission standards. In the same way, Communication Links 305 and 306 may include T1, T3, DS3, DS1, or any other transmission standard known in the art. Ingress Packet Processor 311 and Egress Packet Processor 312 communicate with Ingress Packet Processor 313 and Egress Packet Processor 314 across Network Mesh 309. The packet processors are also coupled to Control Card 323 via Network Mesh 309. For example, Ingress Packet Processor 311 is coupled to Ingress Packet Processor 313 via Network Mesh 309. In one embodiment, Network Mesh 309 is a switch fabric, which includes a full mesh such that each of the packet processors is coupled to one another. However, embodiments of the present invention are not limited to a full mesh for the transmission of data among the packet processors, as any type of switching method that switches based on an addressing scheme can be incorporated into embodiments of the present invention. The number of contents and connections of Network Element 301 are illustrated for the purpose of simplicity and not by way of limitation, as a greater or lesser number of contents or connections may be present within Network Element 301.

Control card 323 is coupled to exchange data with each of the packet processors. Each of the Packet Processors 311-314 is coupled to receive and transmit data. In one embodiment, Packet Processors 311-314 may be connected to an optical line transmitting SONET OC-N signals. Moreover, in an embodiment, Packet Processors 311-314 may be connected to an electrical line such as a T1, T3, E1, E3, Ethernet, Gigabit Ethernet, etc. However, embodiments of present invention are not limited to the above-described examples, as any other type of optical or electrical data transmission can be incorporated into embodiments of the present invention. Additionally, Packet Processors 311 and 312 may be contained within a single network line card or there may be a separate network line card for each. Likewise, Packet Processors 313 and 314 may be contained within a single network line card or there may be a separate network line card for each.

Ingress Packet Processor 311 and Egress Packet Processor 312 are subscriber-side packet processors and connect to Subscribers 135 across Communication Links 303 and 304. As discussed above, the packet processors may be connected using any type of optical or electrical data transmission. Similarly, Ingress Packet Processor 313 and Egress Packet Processor 314 are service-side packet processors, and connect to Internet and/or Service Providers 333 across Communication Links 305 and 306. Additionally, the ingress and egress packet processors 311-314 connect to Control Card 323 through Mesh Network 309 to various BSD Processes discussed herein.

Exemplary System 300 includes an apparatus for connecting Subscribers 335 with Internet and/or Service Providers 333. For example, messages and data sent by Subscribers 335 across Communication Link 303 are received at Ingress Packet Processor 311. Ingress Packet Processor 311 then forwards the data and messages through Network Mesh 309 to Egress Packet Processor 314, which, in turn, forwards across Communication Link 306, messages and data to Internet and/or Service Providers 333. In the same way, messages and data transmitted from Internet and/or Service Providers 333 are transmitted across Communication Link 305 to Ingress Packet Processor 313 and forwarded through Network Mesh 309 to Egress Packet Processor 312. Egress Packet Processor 312 then forwards the messages and data to Subscribers 335. In this manner, network traffic between the Subscribers 335 and Internet and/or Service Providers 333 propagate through the various components of Network Element 301.

Control Card 323 performs the monitoring and making of decisions based on network traffic through Network Element 301. Control card 323 includes several BSD processes including STATD Process 324 and AAA Process 322 discussed below, for passing messages between the packet processors and Control Card 323, and between Control Card 323 and Server 325. Messages passed between Network Element 301 and RADIUS Server 325 are passed using electric or optical data transmission connections as discussed above. Additionally, messages passed between Network Element 301 and Server 325 are passed using User Datagram Protocol (UDP) messages. UDP messages are used to transport data packets between different boxes (or nodes) in a network. However, embodiments of the present invention are not so limited. For example, messages passed between Network Element 301 and Server 325 may be passed by any messaging protocol or system known in the art.

Control Card 323 includes AAA Process 322 for the purpose for authenticating, authorizing and accounting of network traffic between Subscriber 335 and Internet and/or Service Providers 333. For example, if Subscriber 335 attempts to access a certain Internet and/or Service Provider 333, Control Card 323 will receive a message at AAA Process 322, which in turn communicates to RADIUS Server 325 where a decision will be made as to whether or not Subscriber 335 has access to Internet and/or Service provider 333.

STATD Process 324, according to one embodiment of the invention, is another process running within Control Card 323. The function of STATD Process 324 is to receive reports of the network traffic volume from the various packet processors and to make decisions based on this reporting. As discussed in more detail below in connection with FIG. 4, STATD Process 324 aggregates the ingress and egress network traffic volume by adding the network traffic in the ingress and egress directions together. Additionally, STATD Process 324 reports to AAA Process 322 whenever a particular subscriber's volume limit has been exceeded.

Figure 3B:
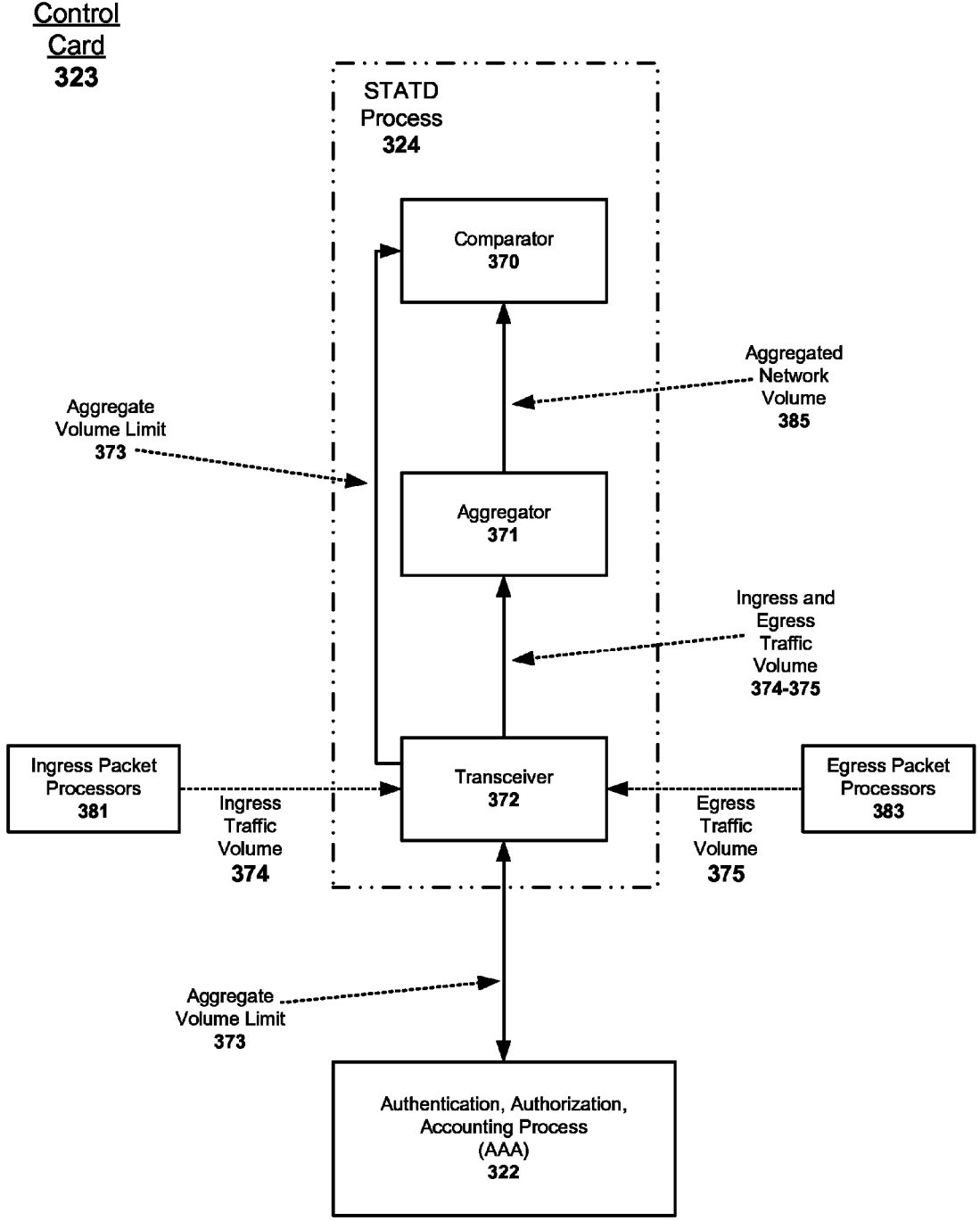
FIG. 3B illustrates a blow-up view of an exemplary network element control card according to one embodiment of the invention.

FIG. 3B illustrates a blow-up view of an exemplary network element control card according to one embodiment of the invention. In FIG. 3B, Control Card 323 includes AAA Process 322 coupled to STATD Process 324. In one embodiment, STATD Process 324 includes Comparator 370, Aggregator 371, and Transceiver 372. AAA Process 322 is coupled to Transceiver 372 so that messages and data can be sent from AAA Process 322 to STATD Process 324 and vice versa. In this embodiment, Transceiver 372 receives the following: Aggregate Volume Limit 373 from AAA Process 322; Ingress Traffic Volume 374 from Ingress Packet Processors 381; and Egress Traffic Volume 375 from Egress Packet Processors 383 (each to be discussed in FIG. 4 below). Aggregator 371 is coupled to Transceiver 372. Aggregator 371 receives Ingress Traffic Volume 374 and Egress Traffic Volume 375 from Transceiver 372 and computes Aggregate Network Volume 385 for each subscriber (not shown) on the network. Comparator 370 is coupled to Aggregator 371 and receives Aggregated Network Volume 385 for each subscriber. Additionally, Comparator 370 is also coupled to Transceiver 372 to receive the Aggregate Volume Limit 373 so that Comparator 370 can compare the per-subscriber Aggregated Network Volume 385 with the per-subscriber Aggregate Volume Limit 373 to determine if the subscriber has exceeded his or her Aggregate Volume Limit 373.

Figure 4:
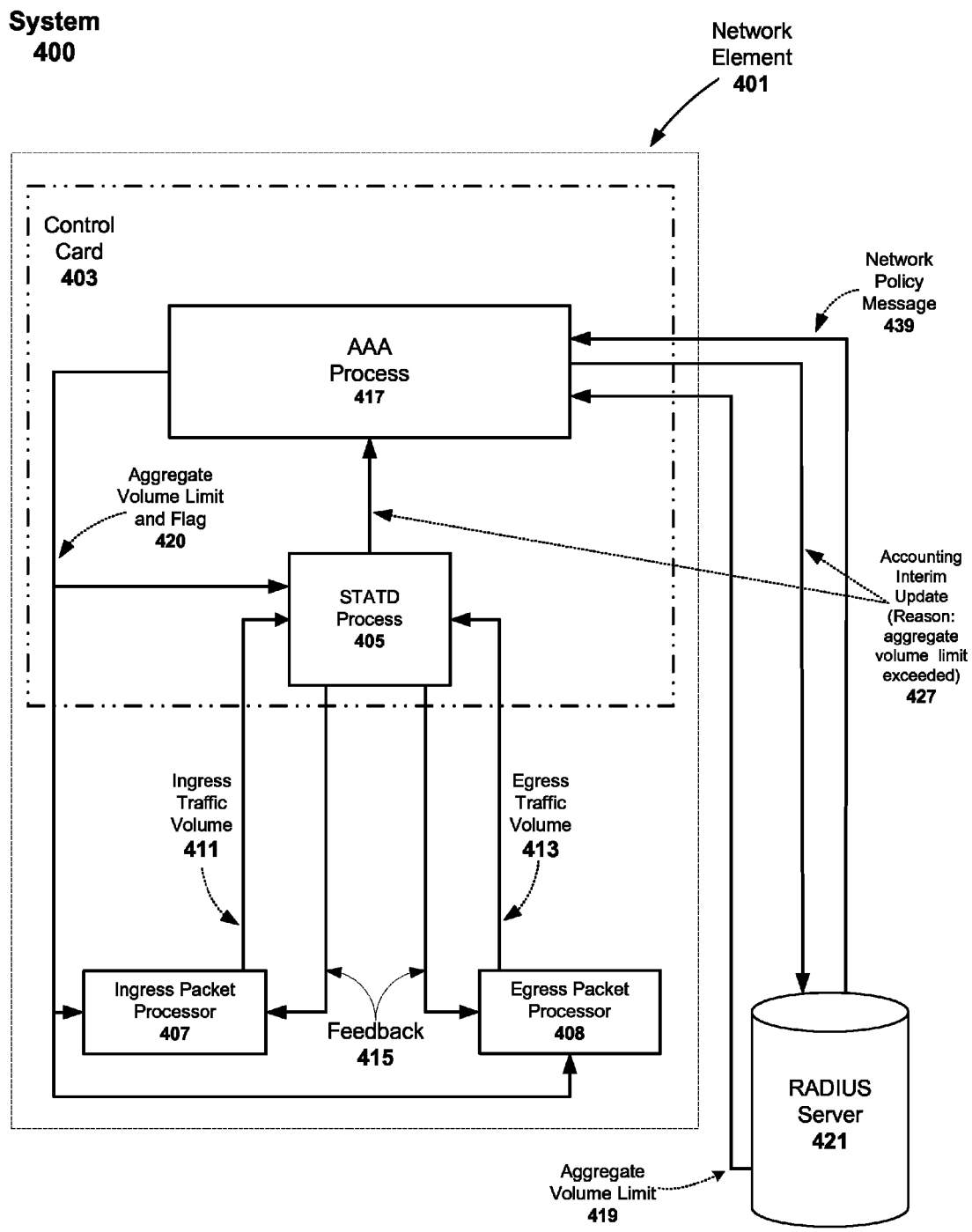
FIG. 4 illustrates network traffic volume limit reporting in an exemplary network element according to one embodiment of the invention.

Referring now to FIG. 4, which illustrates network traffic volume limit reporting in an exemplary network element according to one embodiment of the invention. Exemplary System 400 of FIG. 4 includes Network Element 401 and RADIUS Server 421. Network Element 401 includes Control Card 403 and various ingress and egress packet processors. For the sake of simplicity, only Ingress Packet Processor 407 and Egress Packet Processor 408 have been included. Further, Control Card 403 includes AAA Process 417 and STATD Process 405. This is for illustration purposes only and not by way of limitation. As discussed above, packet processors perform packet forwarding for user data and messages. All data and messages sent between subscribers (not shown) and the Internet and/or service providers (not shown) must travel through Ingress Packet Processor 407 and Egress Packet Processor 408. That is, the network traffic for a particular subscriber must travel into and out of the Packet Processors 407 and 408.

Ingress Packet Processor 407 and Egress Packet Processor 408, each contain a plurality of counters (not shown) for determining network traffic volume for each subscriber. These counters include any counter known in the art. In operation, Radius Server 421 communicates with Control Card 403 and vice versa. A particular subscriber will have an associated level of service. Most levels of service are based on the subscriber's bandwidth requirements. Bandwidth requirements may be determined by many factors including the subscriber's needs and wants, as well as the amount of fee charged each subscriber by service providers (not shown). Service providers are required to pay for bandwidth utilization and often pass these costs onto subscribers. Accordingly, each subscriber associated with a particular Internet service provider will likely have his or her own individual level of service agreement. Each subscriber will have paid for a certain amount of bandwidth. As a result, RADIUS Server 421 also includes a network traffic volume limit (not shown) configured for each subscriber on the network. That is, each subscriber will have an amount of traffic volume allocated based on that subscriber's level of service. As long as a subscriber does not exceed his or her volume limit, Ingress Packet Processor 407 and Egress Packet Processor 408 continue to forward packets associated with the subscriber through Network Element 401 unabated. However, if a subscriber exceeds the network traffic volume limit, certain actions will be taken. Server 421 includes a network policy for determining what actions will be taken in the event a subscriber exceeds his or her network traffic volume limit. For example, Server 421 may implement a network policy where a subscriber is logged off of the network whenever that subscriber exceeds his or her predetermined network traffic volume limit. Alternatively, Server 421 may include a policy to re-direct a subscriber that has exceeded his or her volume limit to a webpage where the subscriber may be given the option to purchase more network bandwidth. In such a case, the subscriber will not be dropped if the subscriber chooses to purchase more network bandwidth. These policies are given by way of example and not by way of limitation. RADIUS Server 421 may have any of a number of different policies based on the particular Internet service provider and a particular subscriber's service level.

During operation, Aggregate Volume Limit 419 is passed to the Ingress Packet Processor 407, Egress Packet Processor 408, and AAA Process 417. As the counters within Ingress Packet Processor 407 and Egress Packet Processor 408 receive network packets, the amount of network traffic is counted and the resulting network traffic volume is passed to STATD Process 405 by way of IPC messages. IPC messaging lets processes, such as BSD processes, send, receive, and queue messages for processing in an arbitrary order. Ingress Packet Processor 407 sends the Ingress Traffic Volume 411 to STATD Process 405. Similarly, Egress Packet Processor 408 transmits Egress Traffic Volume 413 to STATD Process 405. Ingress Packet Processor 407 and Egress Packet Processor 408 also each include per-subscriber timers for counting the interval for which the traffic volume will the reported. Every time the relevant interval expires, Ingress Packet Processor 407 and Egress Packet Processor 408 report their respective traffic volume. In response, Feedback 415 is sent from STATD Process 405 to Ingress Packet Processor 407 and Egress Packet Processor 408. Feedback 415 will be described in more detail with respect to the discussion of FIGS. 5 and 6.

The action to be taken in the event a particular subscriber exceeds his or her volume limit is passed from Server 421 to AAA Process 417 via Server Policy Message 439. Additionally, Aggregate Volume Limit and Flag 420, which is the same as Aggregate Volume Limit 419, is passed from AAA Process 417 to STATD Process 405 and packet processors 407 and 408.

Each subscriber on a network has an associated network volume limit. In order to determine whether a subscriber is getting near to or exceeding his or her network volume limit, each subscriber's actual network volume must be reported. When a subscriber logs onto a network, an initial reporting interval is calculated for each subscriber. Once the initial reporting interval is calculated, network element 401 starts a timer and checks the subscriber's actual network volume at the end of the initial interval.

Additionally, the initial interval may be set to a fast interval or slow interval based for each subscriber based on the subscriber's network volume limit. As discussed above, a system such as exemplary system 400 receives a network traffic volume limit for each subscriber from RADIUS server 421. The initial interval for a particular subscriber may be set to slow when a subscriber logs onto the network. This is because there is less likelihood that a subscriber will exceed his or her network volume limit when first logging onto the network. An exemplary calculation of the initial timer interval for a given subscriber is as follows:

$$\text{Initial reporting interval} = ((\text{max\_agg\_limit} - \text{limit\_used})/2)/(\text{max\_sub\_rate}),$$

where max_agg_limit is the aggregate network volume limit, limit_used is a particular subscriber's reported network traffic volume (which will be essentially zero at the time the subscriber logs onto the network), and max_sub_rate is the maximum allowable line rate for data transfer associated with the subscriber. Alternatively, if a subscriber's volume limit is lower than a predetermined threshold value, a system such as exemplary system 400 may set the initial interval to fast when the subscriber logs onto the network. This is because the subscriber may have such a low network volume limit that it is likely the subscriber will exceed his or her network volume limit a short time after logging onto the network. Whether or not a subscriber's initial interval is set to fast or slow is the subject of FIG. 7 which illustrates an exemplary method of setting a network traffic volume limit reporting interval according to one embodiment of the invention.

Figure 6:
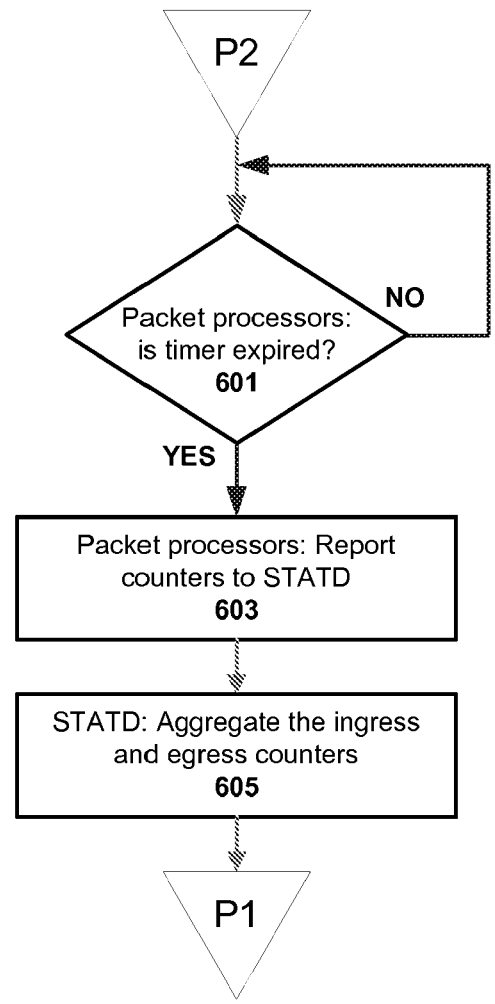
FIG. 6 illustrates an exemplary method of reporting aggregate network traffic volume according to one embodiment of the invention.
Figure 7:
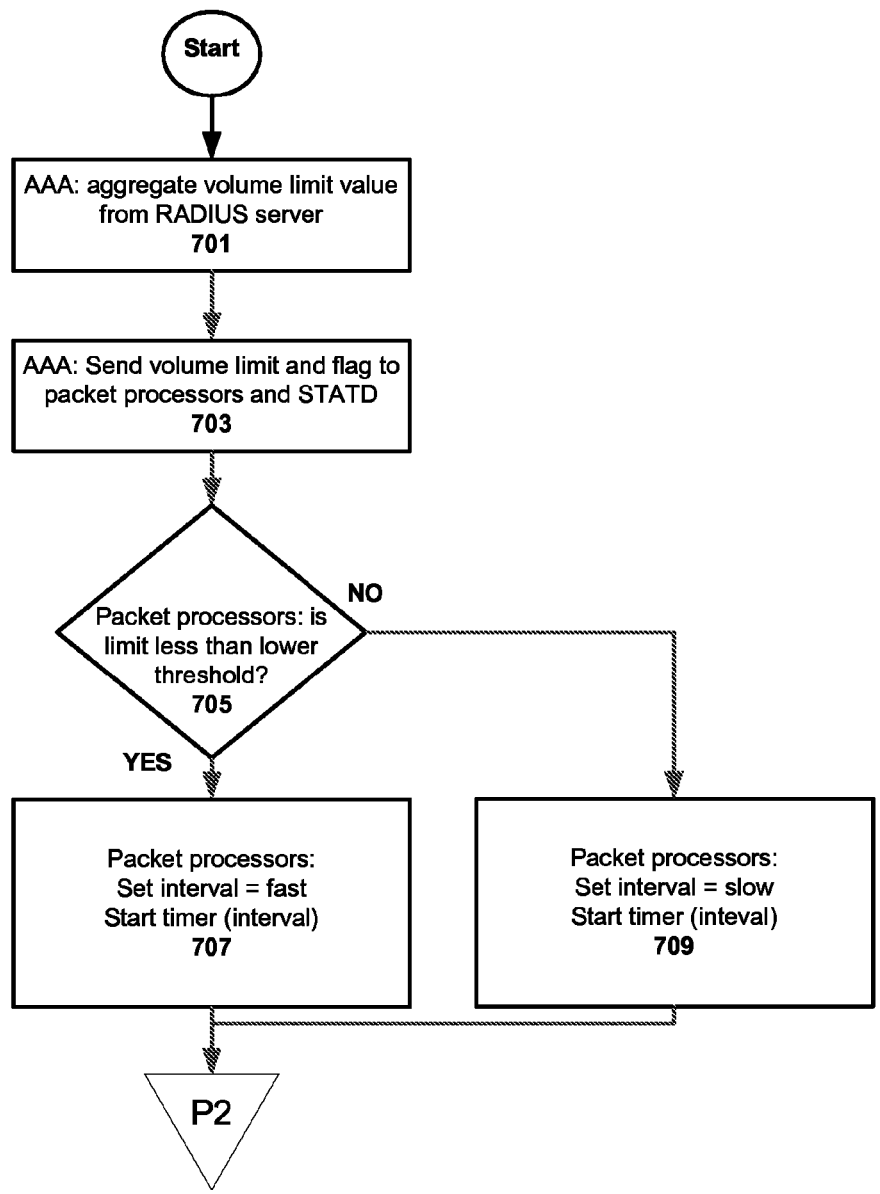
FIG. 7 illustrates an exemplary method of setting a network traffic volume limit reporting interval according to one embodiment of the invention.

In FIG. 7, at step 701, an AAA client receives the volume limit value from the network server (e.g., RADIUS). This may be accomplished through passing of UDP messages discussed above. Control flows to step 703 where AAA process sends the volume limit (aggregate) for each subscriber to the packet processors and to the STATD process. At step 705, the packet processors determine whether the network volume limit is less than a lower threshold. If, in step 705, the volume limit is less than the lower threshold, control flows to step 707 where the packet processors set the initial interval to a fast interval and start the timer. As discussed previously, this occurs when a subscriber has such a low level of service that his or her bandwidth utilization may quickly result in the subscriber exceeding his or her network traffic volume limit. If the limit is not less than the lower threshold, however, control flows to step 709 where the packet processors set the initial time interval to slow and control flows to P2 of FIG. 6.

Once the initial interval is set, a system such as exemplary system 400, starts a timer and begins the process of determining whether each subscriber is approaching or has exceeded his or her allocated network volume limit. Referring now to FIG. 6, which illustrates an exemplary method of reporting aggregate network traffic volume according to one embodiment of the invention. At step 601, it is determined whether the time interval for reporting network traffic volume has expired. The time interval in this case may either be a fast, medium or slow timer. For example, a fast timer such as the fast timer from steps 705-709 of FIG. 7 may be implemented. If the time interval has not expired, the packet processors continue to count to determine network volume. When the time interval expires, the packet processors report the traffic volume to the STATD process. At step 605, the STATD process aggregates the ingress and egress traffic volume by adding them together and control flows to P1 of FIG. 5.

Figure 5:
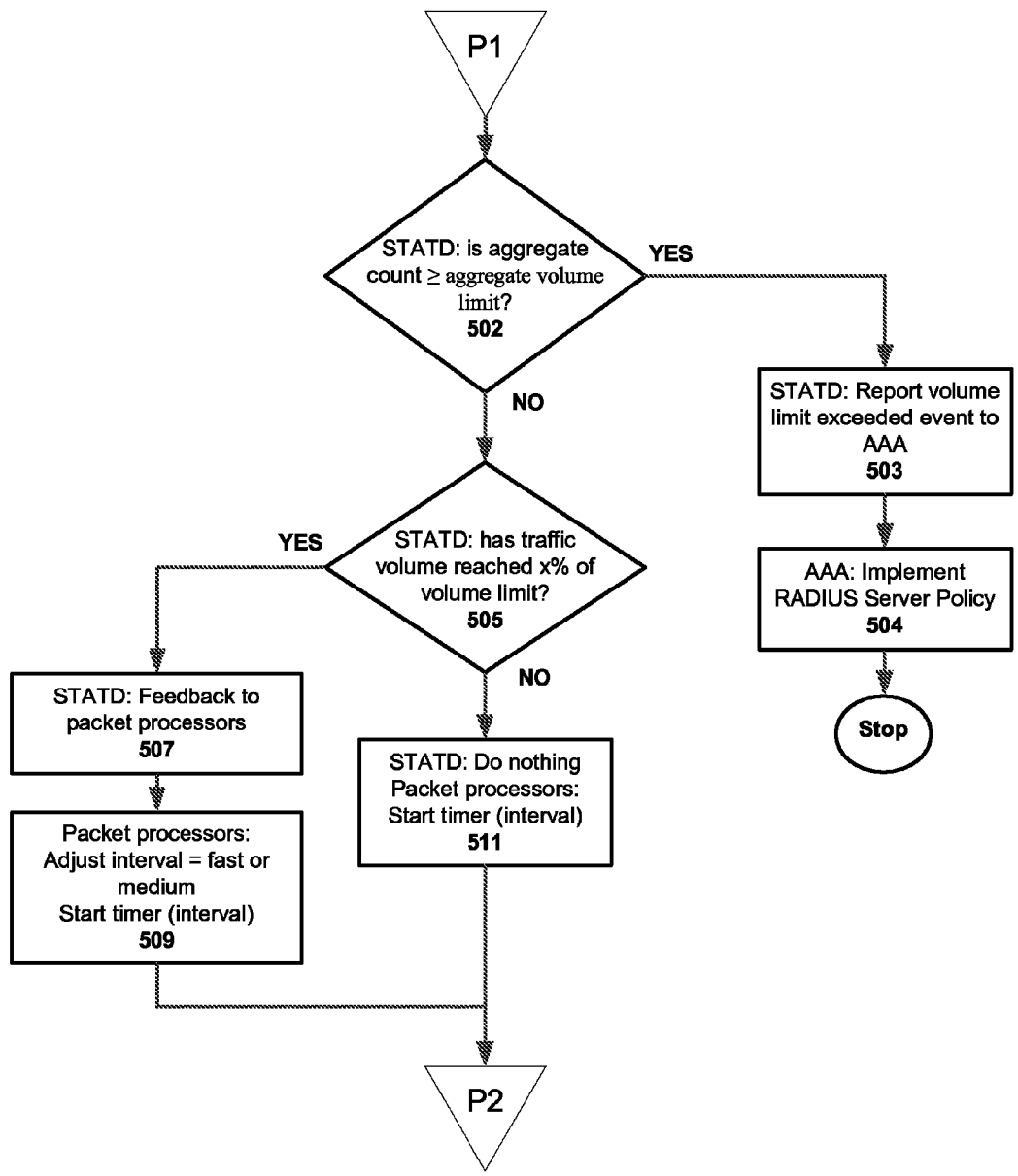
FIG. 5 illustrates an exemplary method of dynamically adjusting a network traffic volume limit reporting interval according to one embodiment of the invention.

FIG. 5 illustrates an exemplary method of dynamically adjusting a network traffic volume limit reporting interval according to one embodiment of the invention. As discussed above, the invention dynamically adjusts the frequency of reporting based on the nearness of a subscriber's reported network traffic volume to the network volume limit. In step 502, STATD determines whether the aggregate traffic volume count is greater than the aggregate volume limit. To do this, STATD adds each subscriber's reported ingress traffic volume with his or her reported egress traffic volume sent from the ingress and egress packet processors, respectively. If the aggregate count has exceeded the network traffic volume limit, control flows to step 503 and STATD reports to the AAA process that the volume limit has been exceeded. In this event control flows to step 504 where the AAA process implements the network policy received from the network server.

If, on the other hand, the network volume limit has not been reached in step 502, control flows to step 505 where STATD determines whether the reporting interval needs to be adjusted. The reporting interval is adjusted on a per-subscriber basis and needs to be adjusted based on the nearness of each subscriber's reported network traffic volume to his or her network volume limit. If a subscriber's reported network volume has reached or exceeded a predetermined threshold value, say X % of the subscriber's aggregate network volume limit, then control flows to step 507 where the STATD process sends feedback to the packet processors instructing them to adjust their respective reporting time intervals to a shorter interval (higher frequency of reporting). Control flows to step 509 where the packet processors adjust the time interval based on the feedback received from the STATD process. Since the threshold has been exceeded in step 505, the packet processors will be instructed by the STATD process to set the next time interval to a shorter interval (faster) and the timer is re-started. This new time interval will be employed by the packet processors for reporting traffic volume until the next reporting sequence. Control flows to P2 of FIG. 6.

If, however, the subscriber's reported network volume has not reached or exceeded the predetermined threshold value, then control flows to step 511 and the STATD does nothing and the time interval remains the same. When the STATD process does nothing, the packet processors are not instructed to adjust the time interval and the timer for each of the packet processors is restarted using the previous time interval. The packet processors do not receive instructions from the STATD process to adjust the time interval to a shorter time interval. In this case, the packet processors start the timer based on the previous interval. Control flows to P2 of FIG. 6 and the process repeats itself.

In one embodiment, the threshold value is a percentage of the aggregate network volume limit. Alternatively, there may be several threshold values at which the time interval is adjusted. For example, there may be $threshold_1$ at X %, $threshold_2$ at Y %, and $threshold_3$ at Z %, each corresponding to adjusting to a shorter reporting time interval as a subscriber's network utilization approaches the network volume limit. Additionally, there may be a continuum of values at which the timer is continuously adjusted as a subscriber's network utilization approaches his or her volume limit.

The processes in FIGS. 5-7 repeat in a cyclical manner for each reporting interval. The invention also includes the case where a subscriber's reported network volume exceeded the predetermined threshold, and then, during a subsequent reporting interval, the subscriber's reported network volume falls back below the threshold value. In this case, at step 507, the STATD process provides feedback to the packet processors to adjust the reporting interval to a longer interval. As discussed above, there may be more than one reporting interval under the teachings of the invention.

These processes are performed by processing logic that may comprise hardware (circuitry, dedicated logic, etc.), software (such as is run on a general purpose computer system or a dedicated machine), or a combination of both. Additionally, the network elements and control cards include memories, processors, and/or Application-Specific-Integrated-Circuits (ASICs).

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Thus, a method and apparatus for adaptive network traffic volume limit reporting is disclosed. Throughout the foregoing description, for the purposes of explanation, numerous specific details were set forth in order to provide a thorough understanding of the invention. It will be apparent, however, to one skilled in the art that the invention may be practiced without some of these specific details.

Accordingly, the scope and spirit of the invention should be judged in terms of the claims which follow.

What is claimed is:

1. An adaptive method for dynamically adjusting the frequency of network traffic volume reporting performed on a network element, comprising:

receiving network traffic, at the network element, from a plurality of subscribers;

receiving, at the network element, a network traffic volume limit for each of the plurality of subscribers from a RADIUS server; and reporting the network traffic volume for each of the plurality of subscribers based on expiration of a time interval associated with each subscriber;

adjusting the time interval associated with each subscriber such that the network volume reporting to the RADIUS server for each subscriber is performed infrequently if the subscriber is not approaching their network traffic volume limit and more frequently as the subscriber approaches their network traffic volume limit.

2. The method of claim 1, wherein the network traffic volume limit for each subscriber is based on that subscriber's individual level of service.

3. The method of claim 1, further comprising calculating an initial interval for a subscriber based on their network traffic volume limit and line rate.

4. The method of claim 3, wherein the reporting further comprises:
starting a timer, the timer set to expire at the end of the time interval;
counting the ingress and egress network volume using a plurality of counters; and
reporting values of the counted ingress and egress network volume when the timer expires.

5. The method of claim 3, wherein the adjusting further comprises:
calculating an aggregate network volume by adding together the reported values for the ingress and egress network volume; and
performing the following for each subscriber of the plurality of subscribers as long as the aggregate count is less than the network volume limit:
adjusting the time interval to a shorter interval if the traffic volume has reached a threshold value, the threshold value being a percentage of the network volume limit; and
restarting the timer, the timer set to expire at the end of the adjusted time interval.

6. The method of claim 4, wherein the plurality of counters comprises:
at least one ingress counter to count the network volume associated with each subscriber in the ingress direction; and
at least one egress counter to count the network volume associated with each subscriber in the egress direction.

7. A method for network volume reporting in a network element comprising:
performing the following at the network element for each subscriber of a plurality of subscribers if an aggregate network volume is less than an aggregate network volume limit;
receiving network traffic from the plurality of subscribers;
receiving the aggregate network volume limit associated with each of the plurality of subscribers from a RADIUS server;
calculating a time interval based on the aggregate network volume limit associated with each subscriber;
starting a timer, the timer set to expire at the end of the time interval;
counting network volume using a plurality of counters, wherein at least one of the plurality of counters counts network volume in an ingress direction and at least one of the plurality of counters counts network volume in an egress direction;
reporting the counted ingress and egress network volume to the RADIUS server when the timer expires;

calculating the aggregate network traffic volume by adding together the reported ingress and egress network volume;
adjusting the time interval to a first time interval if the traffic volume has reached a first threshold value, wherein the first time interval is shorter than the initial time interval and the first threshold value being a percentage of the traffic volume limit; and
restarting the timer, the timer set to expire at the end of the adjusted interval.

8. The method of claim 7, further comprising:
performing the following if the traffic volume limit is less than a predetermined lower threshold value:
setting the initial interval to a short interval; and
starting the timer, the timer set to expire at the end of the short interval.

9. The method of claim 7, further comprising adjusting the time interval to a second time interval if the traffic volume has reached a second threshold value, wherein the second threshold value is a percentage of the traffic volume limit and is greater than the first threshold value.

10. The method of claim 7, wherein the first threshold value is a function of the network volume limit and is adaptive over a range of values as the traffic volume approaches the volume limit.

11. An network element for adaptive network volume reporting comprising:
a plurality of packet processors comprising:
a set of one or more ingress processors, each including a first set of one or more timers; and
a set of one or more egress processors, each including a second set of one or more timers;
a control card comprising:
a first data structure comprising:
a receiver module to receive the following:
an aggregate network traffic volume limit for each of a plurality of subscribers, the aggregate network traffic limit received from a RADIUS server;
an ingress counter value for each subscriber reported from the set of ingress processors; and
an egress counter value for each subscriber reported from the set of egress processors;
an aggregator to compute an aggregate network volume for the plurality of packet processors by adding together the received ingress and egress counter values; and
a comparator to compare the aggregate network volume with the aggregate network volume limit, wherein the control card sends feedback messages to each of the plurality of packet processors to speed up a reporting time interval for reporting o the RADIUS server if the aggregate traffic volume for the plurality of packet processors is greater than a threshold value, the threshold value being a predetermined percentage of the aggregate network traffic volume limit.

12. The apparatus of claim 11, wherein the control card further comprises a second data structure coupled to the first data structure for performing authentication, authorization, and accounting functions in a network.

13. The apparatus of claim 11, wherein receiving an aggregate network traffic volume limit for each of a plurality of subscribers is based on a level of service associated with each subscriber.

14. The apparatus of claim 11, further comprising a server for implementing a policy decision whenever a subscriber or the plurality of subscribers exceeds the traffic volume limit associated with that subscriber.

15. The apparatus of claim 12, wherein the server sends a message instructing the data structure in the control card to implement the policy decision whenever a subscriber or the plurality of subscribers exceeds the traffic volume limit associated with that subscriber.

16. The apparatus of claim 15, wherein the set of one or more actions to be taken includes logging the subscriber off of a network.

17. The apparatus of claim 16, wherein the set of one or more actions to be taken includes dropping the subscriber from the network.

18. The apparatus of claim 17, wherein the set of one or more actions to be taken includes re-directing the subscriber to a web page where the subscriber may purchase a higher amount of network bandwidth.

19. A non-transitory machine-readable storage medium that provides instructions, which when executed by a machine, cause the machine to perform an adaptive method for network traffic volume reporting, the method comprising: receiving network traffic from a plurality of subscribers; receiving a network traffic volume limit for each of the plurality of subscribers from a RADIUS server; and reporting the network traffic volume for each of the plurality of subscribers based on expiration of a time interval associated with each subscriber; adjusting the time interval associated with each subscriber such that the network volume reporting to the RADIUS server for each subscriber is performed infrequently if the subscriber is not approaching their network traffic volume limit and more frequently as the subscriber approaches their network traffic volume limit.

20. The non-transitory machine-readable storage medium of claim 19, wherein the network traffic volume limit for each subscriber is based on that subscriber's individual level of service.

21. The non-transitory machine-readable storage medium of claim 19, further comprising calculating an initial interval for a subscriber based on their network traffic volume limit and line rate.

22. The non-transitory machine-readable storage medium of claim 19, wherein the reporting further comprises: starting a timer, the timer set to expire at the end of the time interval; counting the ingress and egress network volume using a plurality of counters; and reporting values of the counted ingress and egress network volume when the timer expires.

23. The non-transitory machine-readable storage medium of claim 22, wherein the adjusting further comprises: calculating an aggregate network volume by adding together the reported values for the ingress and egress network volume; and performing the following for each subscriber of the plurality of subscribers as long as the aggregate count is less than the network volume limit: adjusting the time interval to a shorter interval if the traffic volume has reached a threshold value, the threshold value being a percentage of the network volume limit; and restarting the timer, the timer set to expire at the end of the adjusted time interval.

24. The non-transitory machine-readable storage medium of claim 22, wherein the plurality of counters comprises: at least one ingress counter to count the network volume associated with each subscriber in the ingress direction; and at least one egress counter to count the network volume associated with each subscriber in the egress direction.

* * * * *

UNITED STATES PATENT AND TRADEMARK OFFICE
CERTIFICATE OF CORRECTION

| | | |
|---|---|---|
| PATENT NO. | : 7,944,836 B2 | Page 1 of 1 |
| APPLICATION NO. | : 11/948015 | |
| DATED | : May 17, 2011 | |
| INVENTOR(S) | : Chinnaswamy et al. | |

It is certified that error appears in the above-identified patent and that said Letters Patent is hereby corrected as shown below:

In Column 14, Line 53, in Claim 11, delete "o" and insert -- to --, therefor.

Signed and Sealed this
Fourth Day of October, 2011

David J. Kappos
*Director of the United States Patent and Trademark Office*